US011102203B1

(12) United States Patent
John et al.

(10) Patent No.: US 11,102,203 B1
(45) Date of Patent: Aug. 24, 2021

(54) METHOD OF AUTHENTICATING A DEVICE

(71) Applicant: Silego Technology Inc., Santa Clara, CA (US)

(72) Inventors: Nathan John, Prescott, AZ (US); John McDonald, Sunnyvale, CA (US)

(73) Assignee: Silego Technology Inc., Santa Clara, CA (US)

( * ) Notice: Subject to any disclaimer, the term of this patent is extended or adjusted under 35 U.S.C. 154(b) by 246 days.

(21) Appl. No.: 16/149,902

(22) Filed: Oct. 2, 2018

(51) Int. Cl.
*H04L 29/06* (2006.01)

(52) U.S. Cl.
CPC .......... *H04L 63/0876* (2013.01); *H04L 63/10* (2013.01)

(58) Field of Classification Search
CPC ............................. H04L 63/0876; H04L 63/10
See application file for complete search history.

(56) References Cited

U.S. PATENT DOCUMENTS

| 8,037,309 | B2 * | 10/2011 | Ooi ........................ G06F 21/78 |
| | | | 713/176 |
| 8,938,616 | B2 * | 1/2015 | Nagai ................... H04L 9/0897 |
| | | | 713/176 |
| 10,298,406 | B1 * | 5/2019 | McDonald ............ H04L 9/0891 |
| 2005/0235143 | A1 * | 10/2005 | Kelly ....................... G06F 21/10 |
| | | | 713/165 |
| 2009/0318114 | A1 * | 12/2009 | Bertoni ................. H04L 9/0841 |
| | | | 455/410 |
| 2010/0023747 | A1 * | 1/2010 | Asnaashari ........ G06Q 20/3563 |
| | | | 713/150 |
| 2013/0267199 | A1 * | 10/2013 | Kamal ................... H04W 12/35 |
| | | | 455/410 |
| 2014/0025951 | A1 * | 1/2014 | Ho ......................... H04L 9/3268 |
| | | | 713/168 |
| 2014/0303983 | A1 * | 10/2014 | Bapat ....................... H04K 1/00 |
| | | | 704/273 |
| 2016/0063267 | A1 * | 3/2016 | Dempsey ............ G06F 21/6218 |
| | | | 726/28 |
| 2016/0219041 | A1 * | 7/2016 | Wei ........................ G06F 21/34 |
| 2017/0038810 | A1 * | 2/2017 | Ueki ....................... G06F 1/266 |
| 2017/0269940 | A1 * | 9/2017 | Valasek ................. H04W 12/04 |
| 2018/0026949 | A1 * | 1/2018 | Kimn .................... H04L 9/3268 |
| | | | 713/156 |
| 2018/0039993 | A1 * | 2/2018 | Rossi ................... G06Q 30/012 |
| 2019/0180027 | A1 * | 6/2019 | Almeida ................. G06F 21/51 |

OTHER PUBLICATIONS

Almohri et al., "Process Authentication for High System Assurance", IEEE Transactions on Dependable and Secure Computing, vol. 11, Issue: 2, Mar.-Apr. (Year: 2013).*

* cited by examiner

*Primary Examiner* — Morshed Mehedi
(74) *Attorney, Agent, or Firm* — Saile Ackerman LLC; Stephen B. Ackerman

(57) ABSTRACT

A method of authenticating a second electronic device at a first electronic device, the method comprising: providing at the second electronic device a memory, the memory comprising a first memory portion which has restricted access and is readable only when a first secret key is presented to the second electronic device; sending the first secret key from the first electronic device to the second electronic device; in response, sending a second secret key stored in the first memory portion from the second electronic device to the first electronic device; and authenticating the second secret key at the first electronic device.

24 Claims, 6 Drawing Sheets

METHOD OF AUTHENTICATING A DEVICE

TECHNICAL FIELD

The present disclosure relates to a method of authenticating an electronic device. In particular, but not exclusively, the present disclosure relates to a method of authenticating an electronic consumable or accessory device.

BACKGROUND

It is known to use encryption for authenticating electronic devices for security purposes. The use of symmetric key encryption can be acceptable when both parties or devices have access to the secret key, such as when the two devices are provided by the same manufacturer. Examples of symmetric key encryption include AES and Blowfish and many others. Nevertheless, each device must include sufficient hardware and/or software to perform decryption (hereinafter, this will be referred to as an encryption engine). This is generally not an issue when the device has a relatively high value. However, it is more significant for consumables and low-cost accessories.

A specific example of this is an e-cigarette and its associated cartridges. The business model used by the e-cigarette manufacturer (sometimes referred to as the razorblade model) may be to sell the e-cigarette at a low price in order to increase sales of the complementary good (cartridge) which has a high markup. Therefore, the manufacturer will wish to prevent the use of cartridges supplied by third parties. Providing a system whereby the cartridge is authenticated by the e-cigarette following insertion of the cartridge in the e-cigarette can mitigate this. However, including an encryption engine within each cartridge increases the manufacturing cost of the cartridge.

SUMMARY

It is desirable to provide an alternative method of authentication between two devices in which at least one of the devices does not require an encryption engine.

According to a first aspect of the present disclosure there is provided a method of authenticating a second electronic device at a first electronic device, the method comprising:
  providing at the second electronic device a memory, the memory comprising a first memory portion which has restricted access and is readable only when a first secret key is presented to the second electronic device;
  sending the first secret key from the first electronic device to the second electronic device;
  in response, sending a second secret key stored in the first memory portion from the second electronic device to the first electronic device; and
  authenticating the second secret key at the first electronic device.

Optionally, the memory includes a second memory portion which is readable without restriction.

Optionally, the method includes storing header information in the second memory portion. Optionally, the header information is stored in an encrypted format.

Optionally, the header information comprises a unique identification number for the second electronic device.

Optionally, the method includes accessing, using the first electronic device, the header information stored in the second memory portion.

Optionally, the method includes decrypting, using the first electronic device, the header information and verifying the header information.

Optionally, the method includes sending the first secret key from the first electronic device to the second electronic device only if the header information passes verification.

Optionally, the method includes, if the header information passes verification, transmitting at least the unique identification number to a central device. Optionally, the unique identification number is transmitted in an encrypted format. Optionally, the method includes transmitting the encrypted header information to the central device.

Optionally, the central device has a memory. Optionally, the central device is a cloud server. Optionally, the method includes decrypting the transmitted information at the central device.

Optionally, the second electronic device is one of a plurality of second electronic devices, each having an associated unique identification number. Optionally, each unique identification number is stored in the memory of the central device. Optionally, the method includes using the central device to match the transmitted unique identification number with the unique identification number stored in the memory.

Optionally, the method includes, in the event that the transmitted unique identification number matches with an already matched stored unique identification number, issuing a command from the central device to the first electronic device to disable the second electronic device.

Optionally, the method includes storing a plurality of first secret keys in the memory of the first electronic device. Optionally, the plurality of first secret keys are stored in a sequence.

Optionally, the method includes storing a plurality of second secret keys in the memory of the second electronic device, each second secret key corresponding to a first secret key. Optionally, the plurality of second secret keys are stored in a sequence.

Optionally, the method includes, in the event that the transmitted unique identification number matches with an already matched stored unique identification number, issuing a command from the central device to the first electronic device to present an alternative first secret key to the second electronic device.

Optionally, the method includes, after a predetermined time period, issuing a command from the central device to the first electronic device to present an alternative first secret key to the second electronic device. The predetermined time period may be one month.

According to a second aspect of the present disclosure there is provided a system comprising a second electronic device which is communicatively coupled to a first electronic device, wherein:
  the second electronic device comprises a memory, the memory comprising a first memory portion which has restricted access and is readable only when a first secret key is presented to the second electronic device,
  and wherein the first electronic device is adapted to send the first secret key to the second electronic device,
  and wherein, in response, the second electronic device is adapted to send a second secret key stored in the first memory portion to the first electronic device,
  and wherein the first electronic device is adapted to authenticate the second secret key.

Optionally, the memory includes a second memory portion which is readable without restriction.

Optionally, the second memory portion is adapted to store header information.

Optionally, the header information is stored in an encrypted format. Optionally, the header information comprises a unique identification number for the second electronic device.

Optionally, the first electronic device is adapted to access the header information stored in the second memory portion.

Optionally, the first electronic device is adapted to decrypt the header information and verifying the header information.

Optionally, first electronic device is adapted to send the first secret key to the second electronic device only if the header information passes verification.

Optionally, in the event that the header information passes verification, the first electronic device is adapted to transmit at least the unique identification number to a central device.

Optionally, the central device has a memory. Optionally, the central device is a cloud server. Optionally, the central device is adapted to decrypt the transmitted information.

Optionally, the second electronic device is one of a plurality of second electronic devices, each having an associated unique identification number.

Optionally, each unique identification number is stored in the memory of the central device.

Optionally, the central device is adapted to match the transmitted unique identification number with the unique identification number stored in the memory.

Optionally, in the event that the transmitted unique identification number matches with an already matched stored unique identification number, the central device is adapted to issue a command to the first electronic device to disable the second electronic device.

Optionally, a plurality of first secret keys are stored in the memory of the first electronic device.

Optionally, the plurality of first secret keys are stored in a sequence.

Optionally, a plurality of second secret keys are stored in the memory of the second electronic device, each second secret key corresponding to a first secret key. Optionally, the plurality of second secret keys are stored in a sequence.

Optionally, in the event that the transmitted unique identification number matches with an already matched stored unique identification number, the central device is adapted to issue a command to the first electronic device to present an alternative first secret key to the second electronic device.

Optionally, after a predetermined time period, the central device is adapted to issue a command to the first electronic device to present an alternative first secret key to the second electronic device. The predetermined time period may be one month.

BRIEF DESCRIPTION OF THE DRAWINGS

The invention will be described below, by way of example only, with reference to the accompanying drawings, in which.

DESCRIPTION

Figure 1:
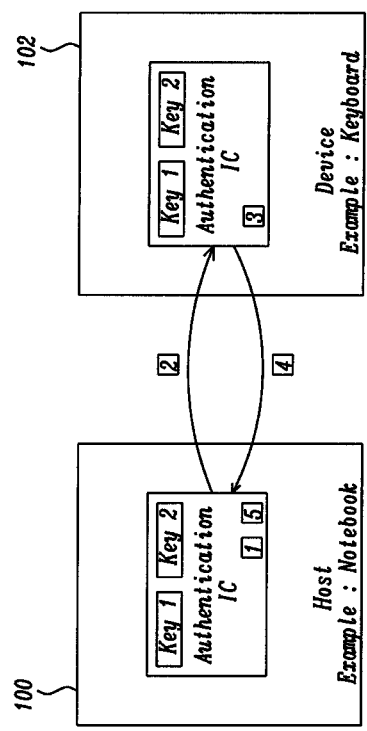
FIG. 1 is a diagrammatic view of a method of authenticating a second electronic device at a first electronic device in accordance with the prior art.
Figure 2:
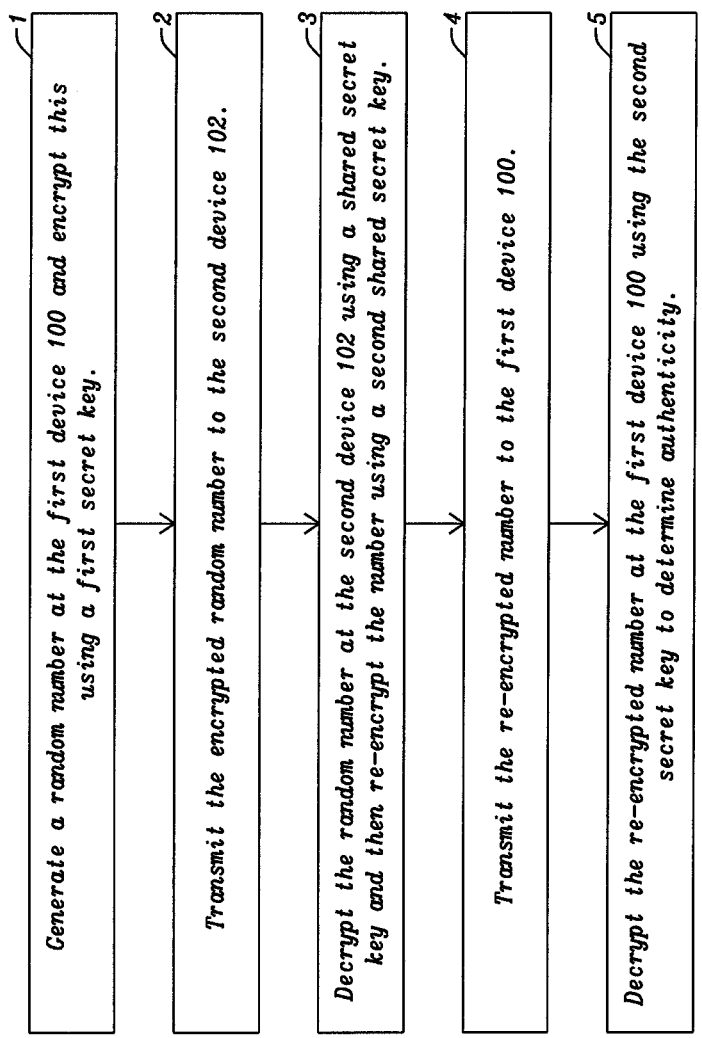
FIG. 2 is a flow diagram for the method of FIG. 1.

FIG. 1 shows a first device 100, such as a laptop, and a second device 102, such as a peripheral device which wishes to connect with the first device 100. To allow the connection, the first device 100 authenticates the second device 102 using a typical and known method and the steps of the method are also indicated in FIGS. 1 and 2.

In step one, the first device 100 generates a random number and encrypts this using a first secret key. In step two, the encrypted number is transmitted to the second device 102. In step three, the second device 102 decrypts the number using an encryption engine and the shared secret key. The second device 102 then re-encrypts the number with a second shared secret key. In step four, the second device 102 transmits the re-encrypted number to the first device 100. In step five, the first device 100 decrypts this using the second secret key to determine authenticity.

The primary disadvantage to this method is the cost associated with the complex circuitry required by the second device 102. In particular, an encryption engine is required.

Figure 3:
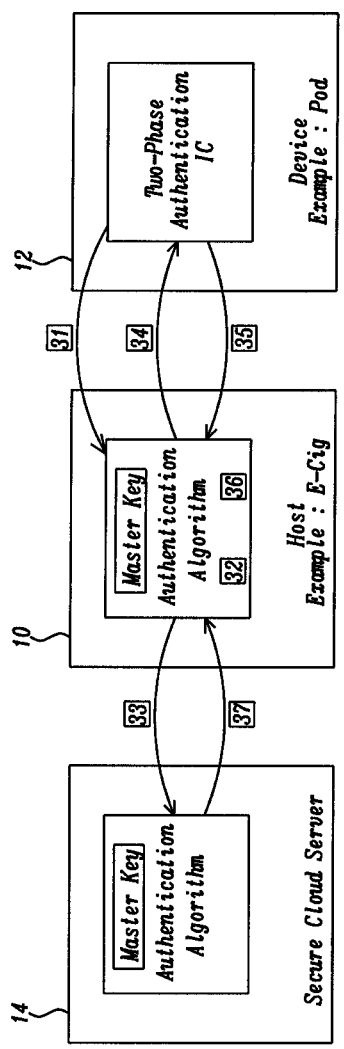
FIG. 3 is a diagrammatic view of a method of authenticating a second electronic device at a first electronic device in accordance with the present disclosure.
Figure 4:
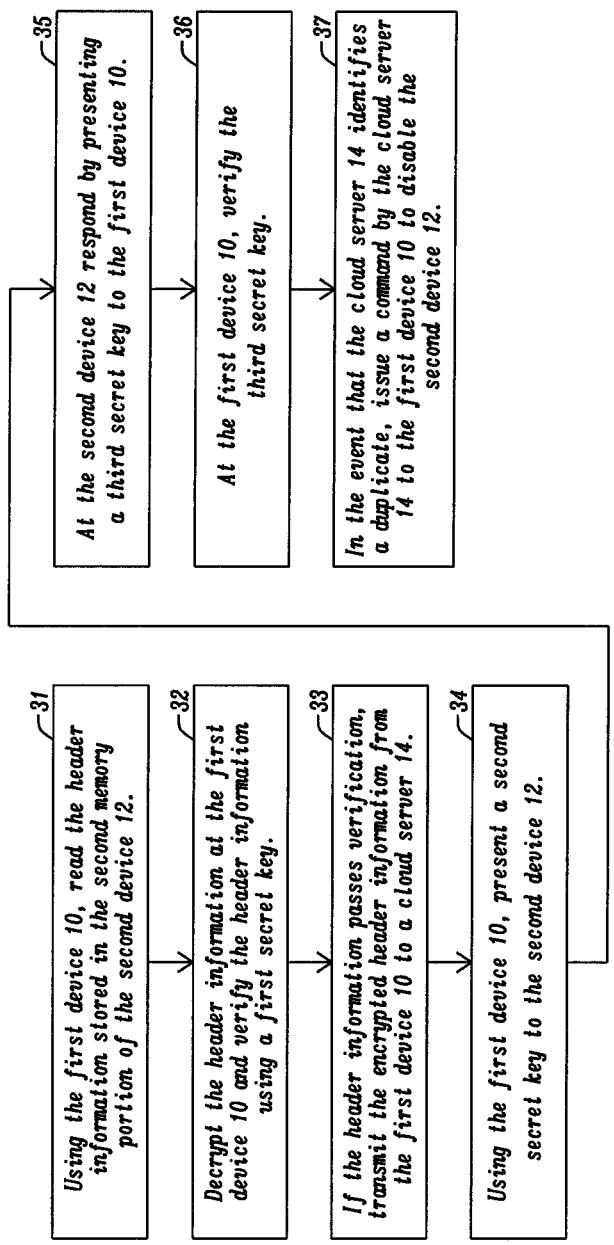
FIG. 4 is a flow diagram for the method of FIG. 3.

FIG. 3 shows a first device 10, such as an e-cigarette, and a second device 12, such as a cartridge for the e-cigarette. The e-cigarette is adapted such that it will only operate if the cartridge can authenticate itself as an official cartridge. The first device 10 authenticates the second device 12 using a method according to the present disclosure and the steps of the method are also indicated in FIGS. 3 and 4.

The second device 12 includes memory storage and this memory comprises two separate memory portions. The first memory portion 22 has restricted access and can only be read when a key is presented as part of the read command. For example, the first memory portion 22 may comprise content-addressable memory (CAM). CAM compares input data against a table of stored data and returns the matching data. In other words, the input data must be known in advance before the matching data will be returned.

The second memory portion 24 can be read by any connected device without restriction. Within the second memory portion 24, device header information is stored in an encrypted format. Typically, the header information could comprise three blocks of data, each 128 bits in length. The header information can include a manufacturer's code, a product code, and also a unique identification number for that cartridge.

In step 31, the first device 10 reads the header information stored in the second memory portion 24 of the second device 12. In step 32, the first device 10 decrypts and verifies the header information. This is the first factor of the two factor authentication process.

In step 33, if the header information passes verification, the first device 10 transmits the encrypted header information to a cloud server 14. The cloud server 14 decrypts the header information and stores the unique identification number of the cartridge.

In step 34, the first device 10 presents a first secret key to the second device 12. This secret key is the address of the CAM of the second device 12.

In step 35, the second device 12 responds by presenting the matched data in the CAM to the first device 10. This matched data represents a second secret key. In step 36, the first device 10 verifies the second secret key. This is the second factor of the two factor authentication process.

Using the example of the e-cigarette and cartridge, an unofficial second device 20 (cartridge) may have been produced by a third party. In a first case, the third party may have been unable to decrypt the header information and so the correct header information is not stored in the unofficial cartridge. The cartridge will not pass the first stage of authentication.

In a second case, the third party may have cloned the header information stored in the second memory portion of the second device 12 such that the unofficial cartridge passes the first stage of authentication. However, the second secret key is not so easy to clone as the second secret key (the matched data of the CAM) of the second device 12 is not accessible without knowing the first secret key (the appropriate address of the CAM). The cartridge will not pass the second stage of authentication.

Figure 5:
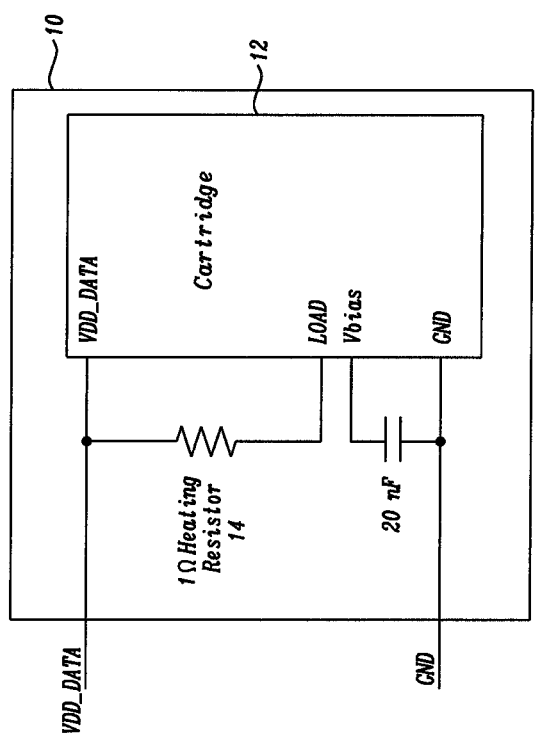
FIG. 5 is a high level circuit diagram of the first and second electronic devices of FIG. 3.

As shown in FIG. 5, the e-cigarette 10 includes a heating resistor 14. The heating resistor 14 heats the liquid within the cartridge to generate the vapour that the user inhales. The heating resistor 14 is in a circuit along with the cartridge 12. Only if the cartridge has passed both stages of authentication will power be supplied to the circuit. Therefore, an unauthenticated cartridge will be disabled.

In a third case, the third party may hypothetically have managed to crack the second key, such as by using brute force. The cartridge will pass both stages of authentication and be usable. However, this will have the consequence that the unofficial cartridge will have the same unique identification number as an official cartridge. The cloud server 14 is adapted to check each received unique identification number and identify duplicates.

In step 37, in the event that the cloud server 14 has identified one or more duplicates, there is the option for the cloud server 14 to issue a command to the first device 10 to disable any cartridges that have a duplicate unique identification number.

Figure 6:
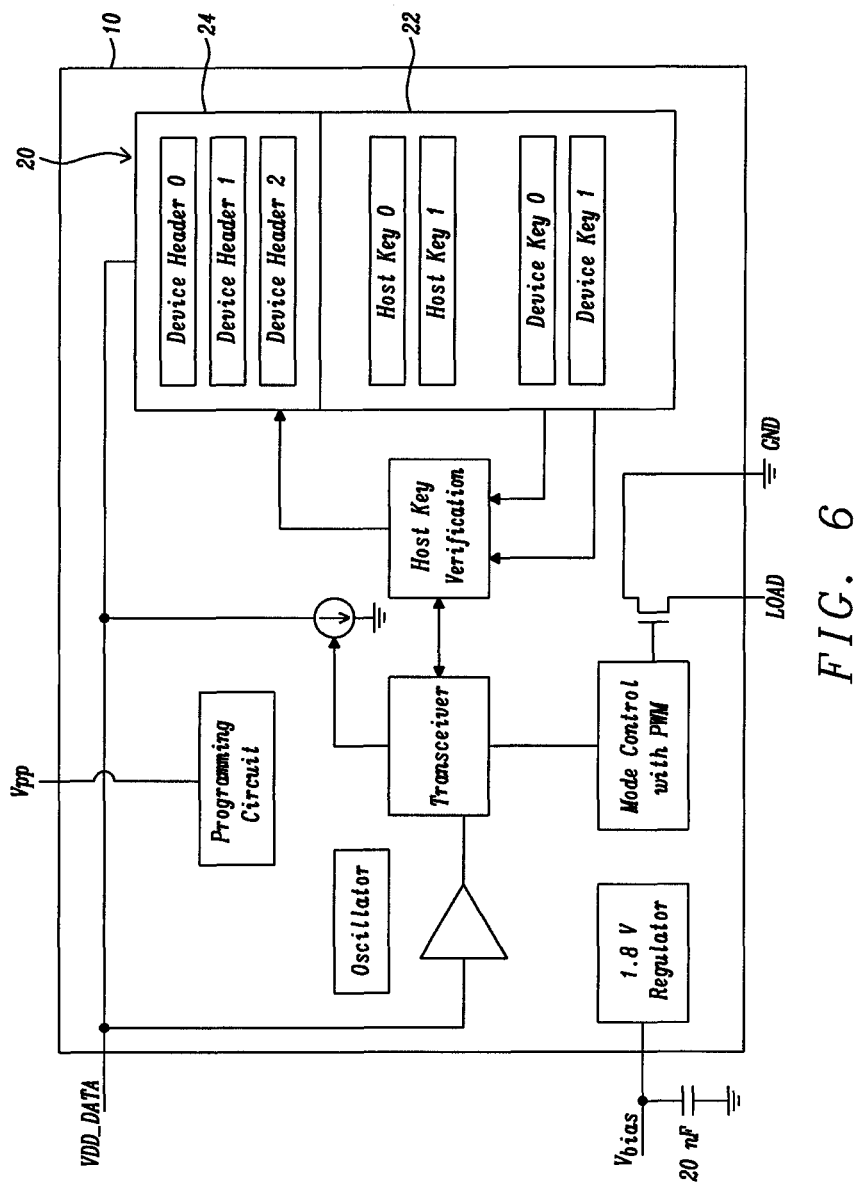
FIG. 6 is a more detailed circuit diagram of the first and second electronic devices of FIG. 3.

FIG. 6 shows a more detailed circuit diagram for the first and second devices. It can be seen that the second device 12 has two second secret keys (termed "device key" in FIG. 6).

In the event that the transmitted unique identification number matches with a duplicate number, a command can be issued from the cloud server 14 to the first device 10 to present an alternative first secret key to the second device 12. In which case the other second secret key will be returned. A third party would have to be aware of, and to crack, these alternative first and second secret keys for the unofficial cartridge to remain usable after the command has been issued.

As a further security option, a command could be issued from the cloud server 14 to the first device 10 to present an alternative first secret key to the second electronic device after a predetermined time period, such as one month.

It should be noted that the cloud server 14 is an ancillary aspect of the disclosure. In alternative embodiments, it may not be included.

Various modifications and improvements can be made to the above without departing from the scope of the invention. In particular, it is to be appreciated that the disclosure applies to any type of electronic device and that an e-cigarette is just an example. The disclosure has particular utility for situations where a low-cost replacement or reusable device needs to be authenticated due to the economic drivers explained above, but it will be appreciated that the methods of the disclosure could be applied generally for any type of electronic devices irrespective of other commercial or economic concerns. The list of applicable areas would be very long, but may as a non-limiting selection of examples, it may include authentication of printer cartridges, USB memory drives, security dongles, key fobs, identity tags, location trackers, optical and other recordable media items and so on. A person skilled in the art would appreciate how to implement similar software, firmware and hardware technologies to implement the disclosure in these different example use cases.

What is claimed is:

1. A method of authenticating a second electronic device at a first electronic device, the method comprising:
   providing at the second electronic device a memory, the memory comprising a first memory portion which has restricted access and is readable only when a first secret key is presented to the second electronic device;
   sending the first secret key from the first electronic device to the second electronic device;
   in response, sending a second secret key stored in the first memory portion from the second electronic device to the first electronic device; and
   authenticating the second secret key at the first electronic device.

2. The method as claimed in claim 1, wherein the memory further comprises a second memory portion which is readable without restriction, and wherein data is stored in the second memory portion.

3. The method as claimed in claim 2, further comprising storing header information in the second memory portion.

4. The method as claimed in claim 2, wherein a unique identification number for the second electronic device is stored in the second memory portion.

5. The method as claimed in claim 2, wherein the method further comprises accessing and verifying, using the first electronic device, the data stored in the second memory portion.

6. The method as claimed in claim 2, wherein the data stored in the second memory portion is in an encrypted format, and wherein the method further comprises decrypting, using the first electronic device, the encrypted data.

7. The method as claimed in claim 5, wherein the method further comprises sending the first secret key from the first electronic device to the second electronic device only if the data passes verification.

8. The method as claimed in claim 5, further comprising, if the data passes verification, transmitting at least the unique identification number to a central device.

9. The method as claimed in claim 8, wherein the second electronic device is one of a plurality of second electronic devices, each having an associated unique identification number, and wherein each unique identification number is stored in the memory of the central device, and wherein the method further comprises using the central device to match the transmitted unique identification number with the unique identification number stored in the memory.

10. The method as claimed in claim 9, further comprising, in the event that the transmitted unique identification number matches with an already matched stored unique identification number, issuing a command from the central device to the first electronic device to disable the second electronic device.

11. The method as claimed in claim 2, further comprising:
    storing a plurality of first secret keys in the memory of the first electronic device; and
    storing a plurality of second secret keys in the memory of the second electronic device, each second secret key corresponding to a first secret key.

12. The method as claimed in claim 11, further comprising, in the event that the transmitted unique identification number matches with an already matched stored unique identification number, issuing a command from the central device to the first electronic device to present an alternative first secret key to the second electronic device.

13. The method as claimed in claim 11, further comprising, after a predetermined time period, issuing a command from the central device to the first electronic device to present an alternative first secret key to the second electronic device.

14. A system comprising a second electronic device which is communicatively coupled to a first electronic device, wherein:
the second electronic device comprises a memory, the memory comprising a first memory portion which has restricted access and is readable only when a first secret key is presented to the second electronic device,
and wherein the first electronic device is adapted to send the first secret key to the second electronic device,
and wherein, in response, the second electronic device is adapted to send a second secret key stored in the first memory portion to the first electronic device,
and wherein the first electronic device is adapted to authenticate the second secret key.

15. The system as claimed in claim 14, wherein the memory further comprises a second memory portion which is readable without restriction, and wherein data is stored in the second memory portion.

16. The system as claimed in claim 15, wherein a unique identification number for the second electronic device is stored in the second memory portion.

17. The system as claimed in claim 15, wherein the first electronic device is adapted to access and verify the data stored in the second memory portion.

18. The system as claimed in claim 15, wherein the first electronic device is adapted to send the first secret key to the second electronic device only if the data stored in the second memory portion passes verification.

19. The system as claimed in claim 16, wherein, in the event that the data passes verification, the first electronic device is adapted to transmit at least the unique identification number to a central device.

20. The system as claimed in claim 19, wherein:
the second electronic device is one of a plurality of second electronic devices, each having an associated unique identification number,
and wherein each unique identification number is stored in the memory of the central device,
and wherein the central device is adapted to match the transmitted unique identification number with the unique identification number stored in the memory.

21. The system as claimed in claim 20, wherein, in the event that the transmitted unique identification number matches with an already matched stored unique identification number, the central device is adapted to issue a command to the first electronic device to disable the second electronic device.

22. The system as claimed in claim 20, wherein:
a plurality of first secret keys are stored in the memory of the first electronic device,
and wherein a plurality of second secret keys are stored in the memory of the second electronic device, each second secret key corresponding to a first secret key.

23. The system as claimed in claim 22, wherein, in the event that the transmitted unique identification number matches with an already matched stored unique identification number, the central device is adapted to issue a command to the first electronic device to present an alternative first secret key to the second electronic device.

24. The system as claimed in claim 22, wherein, after a predetermined time period, the central device is adapted to issue a command to the first electronic device to present an alternative first secret key to the second electronic device.

* * * * *